Figure 1:
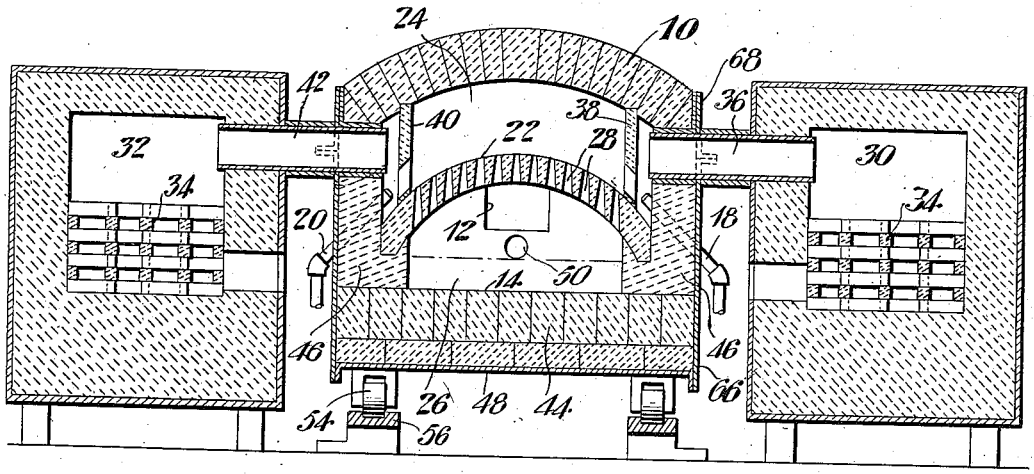

June 5, 1923.

H. O. LOEBELL 1,457,780

GAS FIRED MELTING FURNACE

Filed April 20, 1920

Inventor
Henry O. Loebell
By His Attorney
Edmund G. Borden

Patented June 5, 1923.

1,457,780

UNITED STATES PATENT OFFICE.

HENRY O. LOEBELL, OF NEW YORK, N. Y., ASSIGNOR, BY MESNE ASSIGNMENTS, TO DOHERTY RESEARCH COMPANY, OF NEW YORK, N. Y., A CORPORATION OF DELAWARE.

GAS-FIRED MELTING FURNACE.

Application filed April 20, 1920. Serial No. 375,251.

*To all whom it may concern:*

Be it known that I, HENRY O. LOEBELL, a subject of the King of Rumania, residing at New York city, in the county of New York, State of New York, have invented certain new and useful Improvements in Gas-Fired Melting Furnaces; and I do hereby declare the following to be a full, clear, and exact description of the invention, such as will enable others skilled in the art to which it appertains to make and use the same.

This invention relates to a gas-fired melting furnace and more particularly to a furnace for melting brass and other alloys containing constituents which tend to vaporize at the melting temperatures.

The melting of brass and similar alloys on a large scale by means of gas, presents peculiar difficulties owing to the fact that the zinc forming one of the constituents of the alloy has a comparatively high vapor pressure at the temperatures required for melting the metal mixture. If the alloy is in contact with the heating gases during melting, the zinc tends to vaporize and the vapors will be carried away with the exhaust heating gases and lost. As a result, the alloy becomes poorer in zinc as the melting continues and the composition of the mixture changes continually. On the other hand, a transference of heat from the burning fuel through the walls of the hearth is rendered impracticable because of the limitations imposed by the materials available for the construction of furnaces of this type.

The material which forms the hearth of the furnace and comes in contact with the molten metal must be resistant to the high temperatures employed and must also be incapable of being dissolved in or alloyed with the molten metal, and is therefore restricted to refractory bricks or compositions which become more or less porous at the temperatures employed in the furnace. If, therefore, the fuel for melting the metal is burned in chambers or passageways formed in or under the refractories of which the melting hearth is constructed, there is a tendency for the molten metal to seep through the refractory and fill or clog the heating or combustion passageways, thereby rendering the furnace inoperative. Because of these conditions the melting of brass has heretofore been carried out in small crucibles, thereby involving high labor costs and inefficient heating, or when treated in large batches, has required the use of electric heat with a correspondingly high heating cost.

The primary object of the present invention is to provide a melting furnace in which metals having a high vapor pressure at their melting temperatures, or alloys containing such metals, may be melted without substantial loss or changes in composition due to the volatilization of the metal.

Another object of the invention is to provide a furnace in which metal to be melted is heated by radiation of heat from combustion gases out of direct contact with the metal.

With these and other objects in view, the invention consists in the apparatus described in the following specification and defined in the claims.

Figure 2:
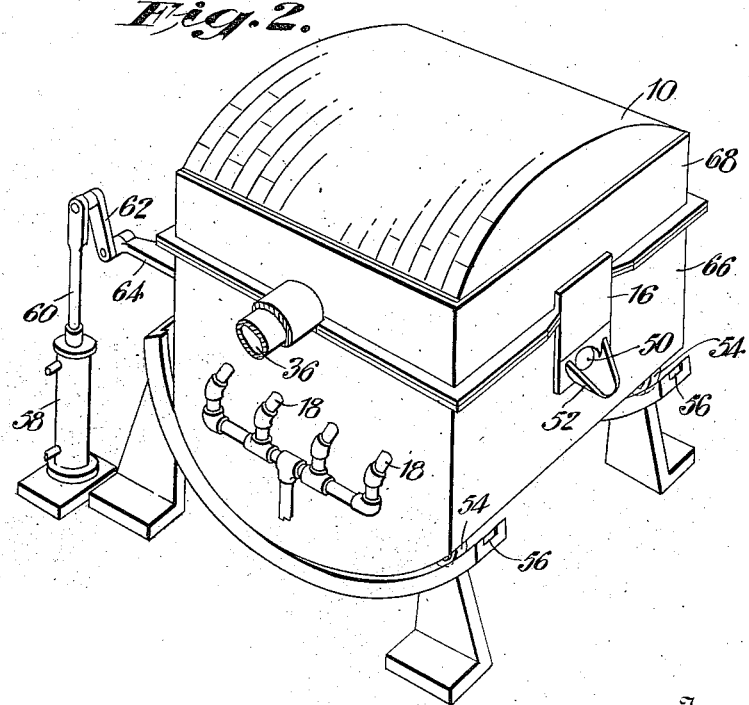

The various features of the invention are illustrated in the accompanying drawings, in which, Figure 1 is a vertical sectional view of a furnace and regenerators embodying the preferred form of the invention, and Fig. 2 is a perspective view of the furnace shown in Fig. 1.

In the present invention the metal to be melted is contained in a hearth which is built up solidly of refractory bricks enclosed within a housing made of metal plates or other suitable material and is heated by radiation of heat supplied by the combustion of fuel gas above the hearth. The burning gases are kept out of direct contact with the melting metal by means of a refractory arch extending over the melting hearth and dividing the furnace into an upper combustion chamber and a lower melting chamber. The combustion chamber and arch are heated to incandescence by direct contact with the burning fuel and hot products of combustion and the heat is radiated from the arch downwardly onto the metal being melted. As the metal melts, some of it may seep into the refractory composition forming the lining of the hearth, but loss from this effect is soon eliminated inasmuch as the seeping metal soon fills the pores and prevents any further seepage. The vapors of zinc or other volatile metals formed above the molten metal are prevented from mixing with the hot products of combustion in the combustion chamber by means of the dividing arch, and the diffusion of metal vapors through the pores of the arch is also opposed by maintaining a gaseous pressure in the combustion chamber slightly greater than or substantially equal to the vapor pressure of the metal in the melting chamber. The rapid transfer of heat by radiation requires the production of very high temperatures in the combustion chamber and to facilitate the production of a sufficiently high temperature and to economize in the use of fuel, the furnace is provided with a set of regenerators which serve to preheat the air supplied to the combustion chamber.

Referring to the accompanying drawings, the metal to be melted is fed into a furnace 10 through an opening 12 and placed on a hearth 14 formed in the lower part of the furnace. The opening 12 is then closed by a door 16 and the furnace is heated by means of fuel supplied alternately through burners 18 and 20 at opposite sides of the upper part of the furnace. The products of combustion are separated from the metal and metallic vapors above the hearth 14 by means of an arch 22 of refractory material extending over the hearth 14 and dividing the furnace into an upper combustion chamber 24 and a lower melting chamber 26. The combustion chamber 24 and arch 22 are heated to incandescence by the burning fuel and radiate heat directly onto the metal in the hearth 14. The arch 22 is preferably of solid or imperforate construction, particularly when a metal or alloy having a high vapor pressure at the temperatures employed is being melted. But when metals or alloys having a comparatively low vapor pressure are being treated, the arch may be provided with openings 28 of a gradually expanding diameter in a downward direction, and so arranged as to permit a uniform radiation from the upper part of the chamber 24 to the surface of the metal on the hearth 14, and to thereby provide a greater radiating effect. There is a tendency as the vapor pressure of the metal vapors increases for the vapor to pass through the pores of the refractory material forming the arch or through the openings 28 into the combustion chamber 24 and to be carried out of the furnace with the exhaust products of combustion. This migration of the vapors is opposed by maintaining the combustion gases in the chamber 24 under a pressure equal to, or somewhat greater than, the vapor pressure of the metal, thereby preventing the metal vapor from forcing its way through the pores or the openings of the arch.

The rate of radiation increases very rapidly as the temperature of the combustion chamber 24 increases. To enable a very high temperature to be generated in the combustion chamber 24 with the maximum economy of fuel, the air serving to support combustion of the fuel introduced through the burners 18 and 20, is preheated in a set of regenerators 30 and 32. When fuel is being supplied to the burner 18, air for supporting combustion is drawn into the regenerator 30 and heated by contact with a checkerwork 34 which will have been previously heated to a high temperature by contact with waste products of combustion in a preceding heating cycle. The preheated air is drawn from the regenerator into the chamber 24 through a connecting conduit 36 and is deflected downwardly into contact with the fuel from the burner 18 by means of a baffle 38 placed at a short distance from the exit end of the conduit. The preheated air mixes with the fuel and is ignited and burned in its passage through the combustion chamber 24. The hot products of combustion pass beneath a baffle 40 at the opposite end of the combustion chamber and flow through a connecting conduit 42 to the regenerator 32 which is thereupon heated by the hot products of combustion. After an interval of time, the direction of flow of air and gases is reversed, air is drawn through the regenerator 32 and conduit 42 and mixed with fuel introduced through the burner 20. The hot products of combustion formed by the combustion of fuel from the burner 20 pass through the conduit 36 and serve to reheat the regenerator 30.

In melting metal as described above, all of the heat required to melt the metal is supplied from the upper part of the furnace. The bottom 44 and sides 46 of the hearth 14 are built up solidly of refractory bricks, and are enclosed within a metal casing 48. Since no heat is transferred through the bottom and side walls of the hearth, the refractory materials forming the lower portion of the hearth will be at a lower temperature than that of the melting metal, and will be in a less porous condition than would be the case if heat were supplied through these refractories to the metal. Moreover, if any metal does seep into the portions of the hearth adjacent the metal, a further seepage of the metal will be prevented by the total or partial solidification of the metal as it reaches colder portions of the refractory lining.

When the melting of the metal is completed, it is poured out of the furnace through an outlet opening 50 and spout 52. To permit the furnace to be tilted for this purpose, it is supported on rollers 54 running on semicircular tracks 56, the centre of curvature of which is the axis of the conduits 36 and 42. The furnace may therefore be tilted about the conduits without disconnecting them from the regenerators 30 and 32, the connections between the conduit and the furnace and regenerators being such as to permit a relative rotation therebetween. For the purpose of tilting the furnace, a hydraulic cylinder and piston 58 is provided and is connected through a piston rod 60 and link 62 to a bracket arm 64 extending from the rear furnace wall.

The enclosing shell 48 of the furnace is made in two sections, a lower section 66 enclosing the melting hearth and an upper section 68 forming a supporting frame for the roof of the furnace. The section 68 may be detached from the lower section 66 and removed with the roof of the furnace to give access to the interior of the combustion chamber 24 for repairing the arch 22 and the melting hearth 14. Inasmuch as those portions of the furnace which come into contact with the molten metal are at comparatively low temperatures, the destruction of the hearth 14 by unequal contractions and expansions and by erosion is, however, very small.

Having described the preferred form of the invention, what is claimed as new is:

1. The combination of a furnace, an arch dividing said furnace into a combustion chamber and a melting chamber, regenerators on opposite sides of said furnace, aligned tubular conduits between said regenerators and said combustion chambers, means for tilting said furnace about the axis of said connections, and fuel supply means for said combustion chamber.

2. A melting furnace, comprising a metallic casing, a refractory lining within said casing forming a fluid-tight receptacle in the lower part of said casing, a cover for said casing, a refractory arch dividing said casing into a melting chamber below said arch and a combustion chamber above said arch, and means for burning fluid fuel in said combustion chamber.

3. A brass melting furnace, which comprises an imperforate hearth, a radiating arch positioned above and covering said hearth, said arch being arranged to radiate heat uniformly to all parts of said hearth, downwardly expanding openings in said arch, gas burners positioned above said arch at opposite sides of said furnace, regenerators at opposite sides of said furnace connected to said furnace adjacent said burners, and means to tilt said furnace about the axis of the connections of said regenerators.

4. A melting furnace for metals, comprising a melting hearth in the lower part of the furnace, a combustion chamber in the upper part of the furnace, a perforated arch for separating the melting of the combustion chamber from the melting hearth, a gas burner positioned in the furnace at the side of the combustion chamber, means to supply gas to the burner, a flue having extended area for supplying air to the burner, and means to cause waste combustion gases to pass in heat interchanging relation to the flue for preheating the air passing to the burner.

5. A tiltable furnace for melting metals having a spout for pouring, a combustion chamber in the upper portion of said furnace, an inlet for fuel and air in the upper portion of said furnace, an outlet for waste combustion products in the upper portion of said furnace, a hearth in the lower portion of said furnace, and a refractory arch for restraining the fuel combustion and waste combustion gases from entering the melting chamber between the hearth and the arch.

6. A melting furnace rotatable for pouring, regenerators mounted adjacent said furnace having air conduit connections with said furnace at its axis of rotation, a combustion chamber in the furnace adjacent said air conduits, a melting chamber in the lower portion of the furnace and separated from said combustion chamber by a perforated arch, air and gas mixing chambers mounted in the combustion chamber opposite said air conduits, and means for introducing gas into one or the other of said mixing chambers in accordance with the direction of the flow of air through the regenerators.

In testimony whereof I affix my signature.

HENRY O. LOEBELL.